US008504609B2

(12) United States Patent
Mansoor et al.

(10) Patent No.: US 8,504,609 B2
(45) Date of Patent: Aug. 6, 2013

(54) SYSTEM AND METHOD FOR FACILITATING SECURE INTEGRATION AND COMMUNICATION OF CLOUD SERVICES AND ENTERPRISE APPLICATIONS

(75) Inventors: Shariq Mansoor, Dublin, CA (US); Rahul Patil, Sunnyvale, CA (US)

(73) Assignee: Fusionops Inc., Sunnyvale, CA (US)

( * ) Notice: Subject to any disclaimer, the term of this patent is extended or adjusted under 35 U.S.C. 154(b) by 336 days.

(21) Appl. No.: 12/861,097

(22) Filed: Aug. 23, 2010

(65) Prior Publication Data

US 2011/0047204 A1 Feb. 24, 2011

Related U.S. Application Data

(60) Provisional application No. 61/236,066, filed on Aug. 21, 2009.

(51) Int. Cl.
*G06F 15/16* (2006.01)
*G06F 15/167* (2006.01)

(52) U.S. Cl.
USPC .......................................... 709/202; 709/216

(58) Field of Classification Search
None
See application file for complete search history.

(56) References Cited

U.S. PATENT DOCUMENTS

| 5,754,830 | A | * | 5/1998 | Butts et al. ..................... 719/311 |
| 7,996,525 | B2 | * | 8/2011 | Stienhans et al. ............. 709/224 |
| 2002/0042817 | A1 | * | 4/2002 | Lahr ............................. 709/213 |
| 2006/0277314 | A1 | * | 12/2006 | Hesselink et al. ............ 709/229 |
| 2007/0185975 | A1 | * | 8/2007 | Cunningham et al. ........ 709/217 |
| 2009/0183234 | A1 | * | 7/2009 | Oswald et al. .................... 726/3 |
| 2010/0169497 | A1 | * | 7/2010 | Klimentiev et al. .......... 709/228 |

* cited by examiner

*Primary Examiner* — John B. Walsh
(74) *Attorney, Agent, or Firm* — Ellahie & Farooqui LLP; Omair M. Farooqui

(57) ABSTRACT

Methods, apparatuses, and computer program products are disclosed for facilitating integration and communication of cloud services and enterprise applications. The disclosed aspects include identifying a port opened by an integration device within an on-premise system to communicate with a cloud system. A persistent connection with the cloud system is maintained via this port so as to provide on-premise access to the cloud system via the integration device, including access to at least one different device within the on-premise system. Aspects for facilitating a bidirectional communication of distributed objects between an on-premise system and a cloud system are also disclosed. Here, on-premise objects residing within the on-premise system are abstracted, and requests from the cloud system to invoke the on-premise objects are facilitated. Similarly, cloud objects residing within the cloud system are abstracted, and requests from the on-premise system to invoke the cloud objects are facilitated.

18 Claims, 12 Drawing Sheets

SYSTEM AND METHOD FOR FACILITATING SECURE INTEGRATION AND COMMUNICATION OF CLOUD SERVICES AND ENTERPRISE APPLICATIONS

CROSS-REFERENCE TO RELATED APPLICATIONS

This application claims the benefit of U.S. Provisional Patent Application Ser. No. 61/236,066 entitled "SYSTEM AND METHOD FOR FACILITATING SECURE INTEGRATION AND COMMUNICATION OF CLOUD SERVICES AND ENTERPRISE APPLICATIONS," which was filed Aug. 21, 2009. The aforementioned application is herein incorporated by reference in its entirety.

TECHNICAL FIELD

The subject disclosure generally relates to cloud computing and more particularly to facilitating secure integration and communication of cloud services and enterprise applications.

BACKGROUND

Enterprise information technology (IT) has become increasingly complex, expensive and difficult to modify to support a company's changing requirements. With tightening budgets, businesses have begun to look for alternative options to IT to address these evolving requirements, including options provided by cloud services.

The term "cloud services" is a term used to describe IT applications that can be accessed 'on demand' from an external provider that hosts the application and provides a comprehensive set of support services to all users of these hosted applications. Cloud services have become increasingly popular since they can be quickly and easily deployed/used and because they are generally less expensive to use compared to on-premise, licensed software applications. Cloud services include IT solutions such as applications for customer relation management (CRM) payroll, email, enterprise resource planning (ERP), document management, and e-commerce from companies such as Netsuite, Salesforce, Google, and Amazon.

Widespread use of cloud services, however, is limited by at least two major technical challenges: integrating cloud-based applications with on-premise applications and creating/customizing pre-built applications rapidly for end customer use.

Integration of cloud-based applications with on-premise applications (defined as a real-time, synchronous and asynchronous connection and bi-directional communication between two applications) requires access to ERP applications, database servers and other on-premise systems. Cloud service to enterprise on-premise system integration also requires a secure network connection, which typically entails either the opening of additional ports (resulting in greater risk from external hackers due to the additional exposure and violation of the security compliance requirements of most companies), or creation of a VPN tunnel. Each of these approaches is relatively expensive and commercially not viable. In legacy ERP systems, for example, providing VPN connections may require substantial changes to the system's existing security architecture. For the cloud provider, a VPN approach would also undesirably require providing a VPN connection to each customer, which is not scalable.

There is currently no way to integrate a cloud application with an on-premise applications using a persistent connection without opening additional ports and/or using VPN. In FIG. 1, for example, a system is illustrated in which a cloud provider system connects to an ERP system via either a single port or VPN. For such system, data synchronization programs (Informatica, FTP, EDI, others) do not provide true application-to-application integration since they simply focus on ensuring that two data sources (e.g., databases, files, etc.) are synchronized. On-demand or on-premise integration software/appliances such as BOOMI, CASTIRON, and Netweaver also do not provide an adequate solution since these applications can only be used to facilitate data synchronization from an on-premise application from inside the firewall application (i.e., inapplicable to bi-directional realtime application-to-application integration).

Web services integration is also inadequate. Web services integration provides an open framework for two programs to publish services they offer using a web services directory. This framework, however, offers a request/response type connection (i.e., non-persistent) between two programs anywhere on a network and may require additional ports to be opened for use (See e.g., FIG. 1). Additionally, both the client and server programs would need a web services directory server, and new services must be created continuously as needed.

It should also be noted that integrating cloud services with on-premise applications would require a bidirectional communication model across a firewall. Within the enterprise firewall, Enterprise Java beans (EJB) provide a framework for remote object invocation, but such approach requires that both applications in the session be running within the firewall owing to its reliance on non standard RMI ports. Also, EJB requires complex configuration and is designed for unidirectional client server object communication where the client may request/retrieve objects from the server with limited support for bidirectional object communication. Furthermore, EJBs requires multiple technology stacks to be installed and configured before any distributed object communication may occur.

The above-described are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating secure integration and communication of cloud services and enterprise applications. In one aspect, a computer-readable storage medium for integrating an on-premise system with a cloud system is disclosed. Within such embodiment, the storage medium stores computer-readable instructions, which include instructions for causing at least one processor to perform a plurality of acts. For instance, instructions are provided for identifying a port opened by an integration device within the on-premise system to communicate with the cloud system. Instructions are also provided for maintaining a persistent connection with the cloud system via the port opened by the integration device, and for providing on-premise access to the cloud system via the integration device. For this embodiment, the on-premise access includes access to at least one different device within the on-premise system.

In another aspect, a cloud device that facilitates integrating a cloud system with an on-premise system is disclosed. Within such embodiment, the apparatus includes a processor configured to execute computer executable components stored in memory. The computer executable components include a communication component, a maintenance component, and an access component. The communication component is configured to facilitate a communication between the cloud device and an integration device within the on-premise system. For this embodiment, the communication component is configured to receive data output by an integrating agent installed in the integration device. Meanwhile, the maintenance component is configured to facilitate maintaining a persistent communication between the cloud device and the integration device via a port initially opened by the integration device, whereas the access component is configured to facilitate accessing at least one different device within the on-premise system via the integration device according to the data output by the integrating agent.

In a further aspect, a computer-readable storage medium for facilitating a bidirectional communication of distributed objects between an on-premise system and a cloud system is disclosed. Within such embodiment, the storage medium stores computer-readable instructions, which include instructions for causing at least one processor to perform a plurality of acts. For instance, instructions are provided for abstracting a plurality of on-premise objects residing within the on-premise system, and for facilitating requests from the cloud system to invoke at least one of the plurality of on-premise objects. Instructions are also provided for abstracting a plurality of cloud objects residing within the cloud system, and for facilitating requests from the on-premise system to invoke at least one of the plurality of cloud objects.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

BRIEF DESCRIPTION OF THE DRAWINGS

Various non-limiting embodiments are further described with reference to the following accompanying drawings.

DETAILED DESCRIPTION

An approach to enable a cloud application to have a secured real-time, persistent connection with any on-premise application is disclosed, without opening additional ports or providing a VPN connection. Cloud applications can thus integrate/communicate with any on-premise application using a secured real-time, bidirectional, persistent connection with the on-premise application using standard ports and firewall rules. In an aspect, a desktop application can monitor for pre-defined conditions, relative to an on-premise application, and communicate with a cloud application and transfer data as needed. The cloud application can also initiate requests to the desktop application for on-premise application services as needed.

By utilizing the innovations described herein, businesses with traditional enterprise applications can now securely extend these applications and add new IT capabilities using the emerging set of cloud service applications. Businesses can also now benefit from lower costs of using cloud applications, and leverage/extend their aging enterprise applications (hard to modify, expensive/time consuming to modify) to enable innovation and business competitiveness. The innovations disclosed herein allow businesses to achieve all of the above very quickly without disrupting their current IT security infrastructure or using any additional IT resources. The disclosed innovations also encourage the development of new cloud applications and the development of new market opportunities for software.

Figure 1:
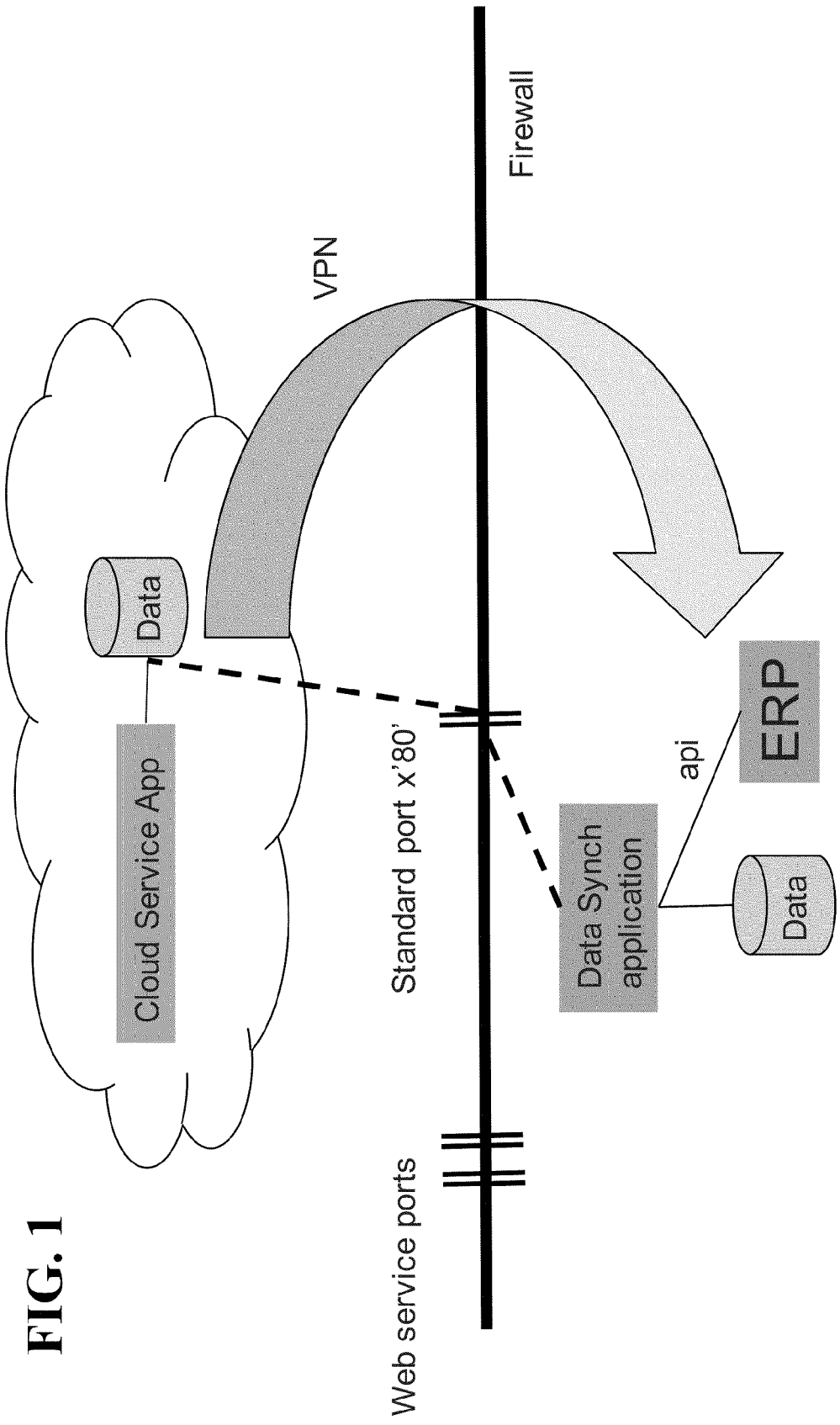
FIG. 1 is an illustration of an exemplary system in which an on-premise system communicates with a cloud system.
Figure 2:
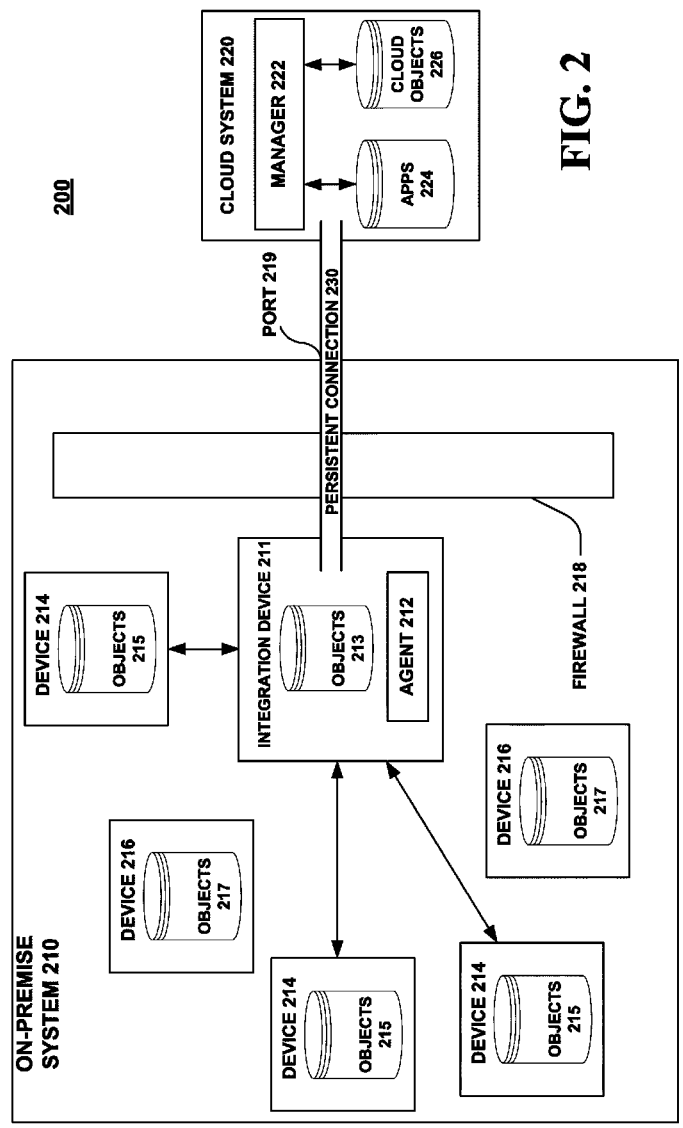
FIG. 2 is an illustration of an exemplary system for facilitating integration of an on-premise system with a cloud system in accordance with an aspect of the subject specification.

Referring next to FIG. 2, an exemplary system for facilitating integration of an on-premise system with a cloud system in accordance with an aspect of the subject specification is provided. As illustrated, system 200 includes an on-premise system 210 that connects to a cloud system 220 across firewall 218 via a persistent connection 230. In an aspect, an integration device 211 within on-premise system 210 includes an integrating agent 212 that facilitates maintaining persistent connection 230. For instance, in an exemplary embodiment, persistent connection 230 is maintained via a port 219 initially opened by integration device 211 (e.g., via standard ports) according to instructions provided by integrating agent 212. Within such embodiment, if integrating agent 212 ascertains that persistent connection 230 has been lost and/or is inadequate, an attempt is made to re-establish persistent connection 230.

In an aspect, integrating agent 212 facilitates providing cloud system 220 with access to other on-premise devices 214 via integration device 211, as illustrated. For instance, an output from integrating agent 212 received by cloud system 220 may identify which devices 214 within on-premise system 210 are accessible to integration device 211. Cloud system 220 may then invoke any of a plurality of distributed objects 213 or 215 residing in either integration device 211 and/or the identified devices 214 accessible to integration device 211. Moreover, as illustrated, cloud system 220 may not access/invoke distributed objects 217 residing in devices 216 inaccessible to integration device 211.

In another aspect, cloud system 220 may include a manager component 222, which is coupled to each of a database storing a plurality of applications 224 and a database storing a plurality of cloud objects 226. Here, because cloud system 220 has access to multiple on-premise devices 211 and 214, applications stored in database 224 may be more sophisticated since they may utilize/leverage any of distributed objects 213 or 215. Such applications 224 may be generic applications and/or applications specific to a particular on-premise system. Similarly, cloud objects 226 may be generic objects and/or objects specific to a particular on-premise system.

In yet another aspect, it should be appreciated that manager 222 may be configured to generate/index a plurality of integrating agents. Indeed, in an embodiment, integration device 211 downloads integrated agent 212 from cloud system 220, wherein manager 222 indexes the particular integrated agent 212 assigned to integration device 211. By appropriately indexing agent 212 to integration device 211, manager 222 ensures that applications 224 and/or objects 226 particular to on-premise system 210 are accessible to integration device 211. Since cloud system 220 may provide services to multiple customers, generating/indexing a unique agent for each customer may be desirable.

Figure 3:
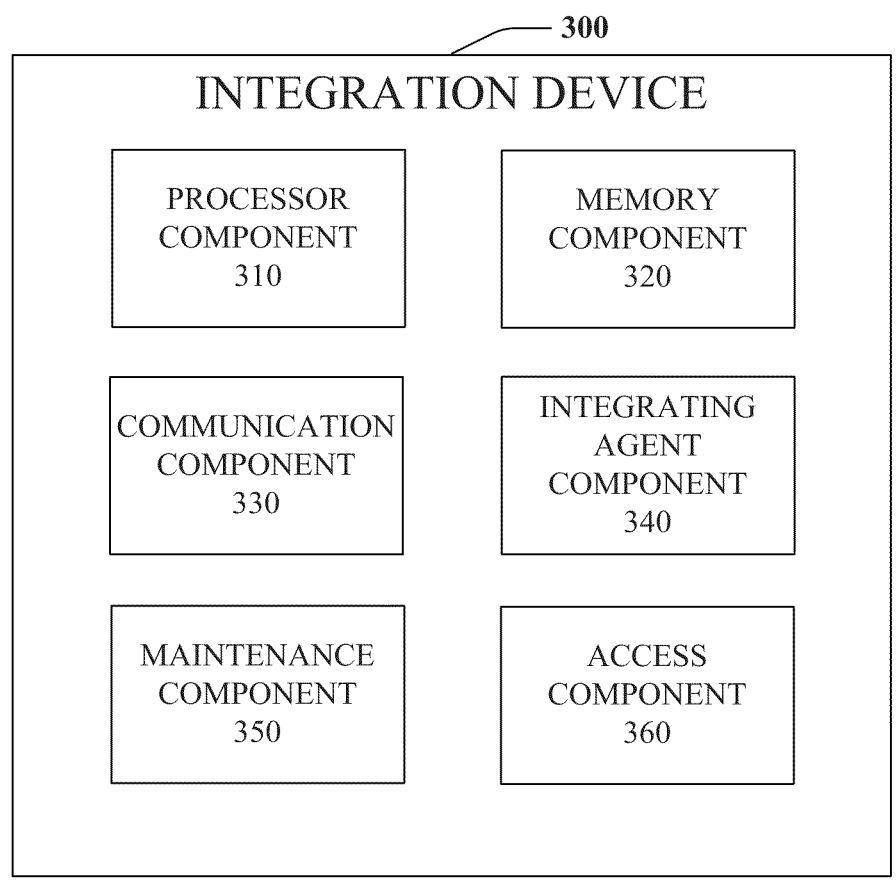
FIG. 3 illustrates a block diagram of an exemplary integration device in accordance with an aspect of the subject specification.

Referring next to FIG. 3, a block diagram illustrates an exemplary integration device in accordance with various aspects. As shown, integration device 300 may include processor component 310, memory component 320, communication component 330, integrating agent component 340, maintenance component 350, and access component 360.

In one aspect, processor component 310 is configured to execute computer-readable instructions related to performing any of a plurality of functions. Processor component 310 can be a single processor or a plurality of processors dedicated to analyzing information to be communicated from integration device 300 and/or generating information that can be utilized by memory component 320, communication component 330, integrating agent component 340, maintenance component 350, and/or access component 360. Additionally or alternatively, processor component 310 may be configured to control one or more components of integration device 300.

In another aspect, memory component 320 is coupled to processor component 310 and configured to store computer-readable instructions executed by processor component 310. Memory component 320 may also be configured to store any of a plurality of other types of data including data output by any of communication component 330, integrating agent component 340, maintenance component 350, and/or access component 360. One of ordinary skill will appreciate that memory component 320 can be configured in a number of different configurations, including as random access memory, battery-backed memory, hard disk, magnetic tape, etc. Various features can also be implemented upon memory component 320, such as compression and automatic back up (e.g., use of a Redundant Array of Independent Drives configuration).

For some aspects, communication component 330 is coupled to processor component 310 and configured to facilitate a communication between integration device 300 and a cloud system. For instance, in one aspect, communication component 330 facilitates communicating with the cloud system to download software (e.g., to download an integrating agent). In another aspect, communication component 330 facilitates invoking distributed objects on the on-premise system and/or the cloud system (e.g., by sending/receiving requests for invoking such distributed objects).

As illustrated, integration device 300 may also include an integrating agent component 340. Within such embodiment, integrating agent component 340 facilitates executing an integrating agent on integration device 300, wherein the integrating agent includes a set of integration instructions.

In another aspect, integration device 300 further includes maintenance component 350. In an embodiment, maintenance component 350 facilitates maintaining a persistent connection with the cloud system according to a set of maintenance instructions included in the set of integration instructions. For this embodiment, maintenance component 350 maintains the persistent connection via a port opened by integration device 300 (e.g., a port opened to facilitate an initial communication with the cloud system).

As illustrated, integration device 300 may also include an access component 360 configured to provide on-premise access to the cloud system via integration device 300. For some aspects, a set of access instructions for providing such on-premise access is included in the set of integration instructions. Here, the on-premise access includes access to at least one different device within the on-premise system.

Figure 4:
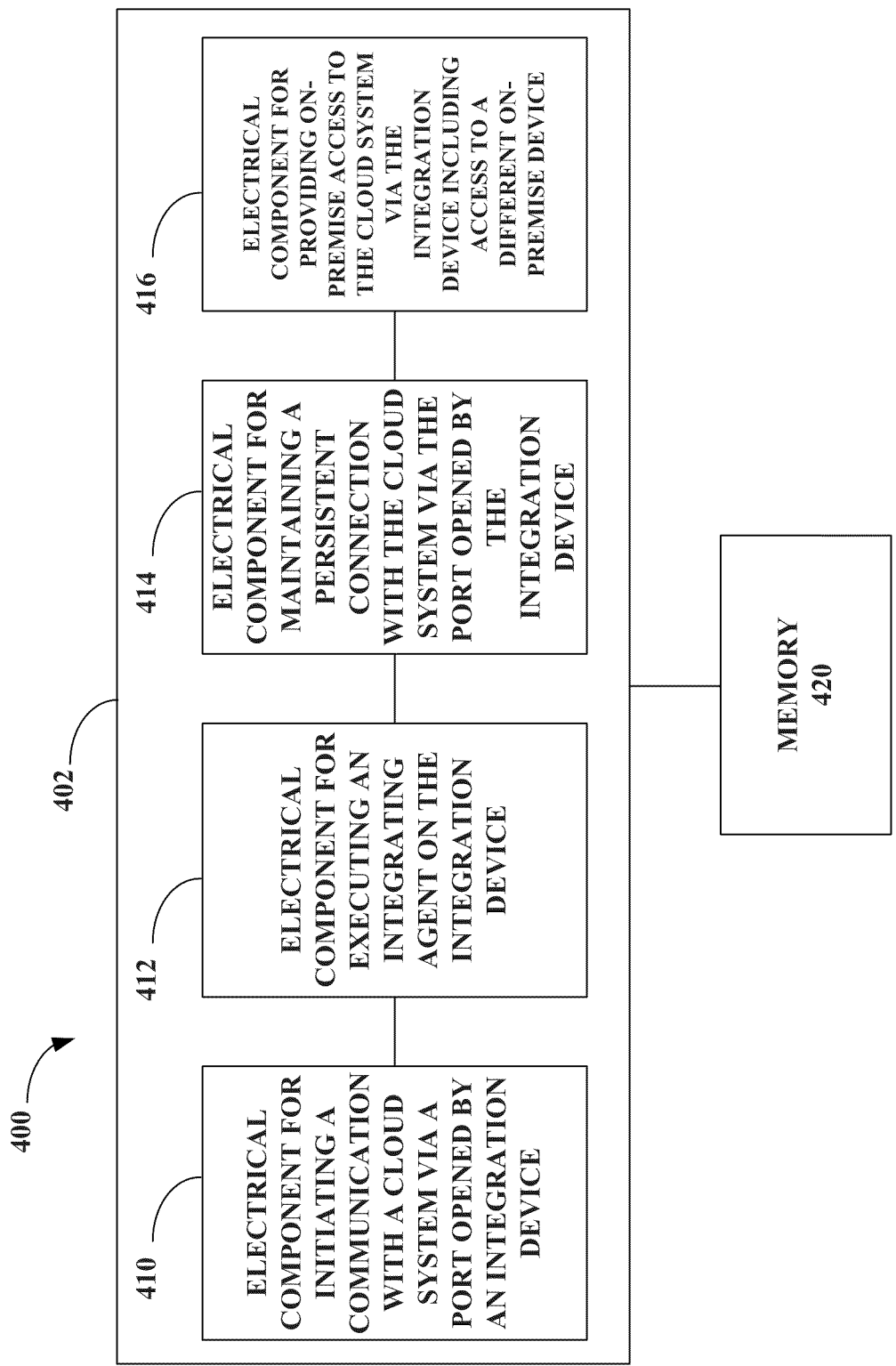
FIG. 4 is an illustration of an exemplary coupling of electrical components that facilitate integrating an on-premise system with a cloud system from within the on-premise system according to an embodiment.

Referring next to FIG. 4, illustrated is a system 400 that facilitates integrating an on-premise system with a cloud system according to an embodiment. System 400 can reside within an on-premise system, for instance. System 400 includes functional blocks that can represent functions implemented by a processor, software, or combination thereof (e.g., firmware), wherein system 400 includes a logical grouping 402 of electrical components that can act in conjunction. As illustrated, logical grouping 402 can include an electrical component for initiating a communication with a cloud system via a port opened by an integration device 410, and an electrical component for executing an integrating agent on the integration device 412. Logical grouping 402 can also include an electrical component for maintaining a persistent connection with the cloud system via the port opened by the integration device 414. Further, logical grouping 402 can include an electrical component for providing on-premise access to the cloud system via the integration device including access to at least one different device within the on-premise system 416. Additionally, system 400 can include a memory 420 that retains instructions for executing functions associated with electrical components 410, 412, 414, and 416, wherein any of electrical components 410, 412, 414, and 416 can exist either within or outside memory 420.

Figure 5:
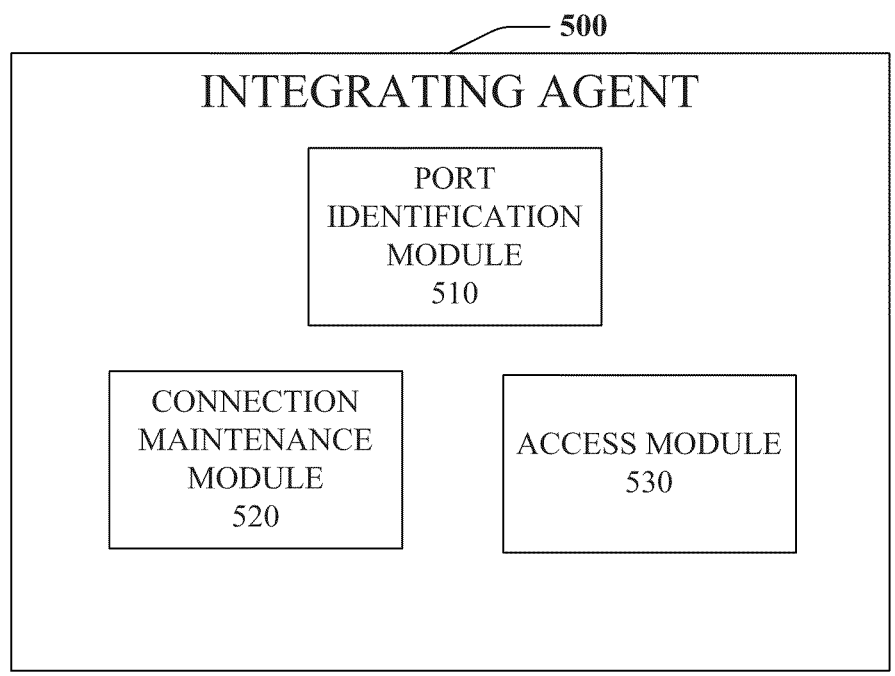
FIG. 5 illustrates a block diagram of exemplary modules for an integrating agent in accordance with an aspect of the subject specification.

Referring next to FIG. 5, illustrated is a block diagram of exemplary modules for an integrating agent. Here, one of ordinary skill in the art will appreciate that such modules may be stored on a computer-readable storage medium as a set of computer-readable instructions, which cause a processor to perform various acts upon execution.

As illustrated, integrating agent 500 may include port identification module 510, connection maintenance module 520, and access module 530. Within such embodiment, port identification module 510 includes instructions for identifying a port initially opened by an integration device within an on-premise system to communicate with a cloud system. Connection maintenance module 520 may then include instructions for maintaining a persistent connection with the cloud system via the port opened by the integration device. Also, ERP access module 530 may include instructions for providing on-premise access to the cloud system via the integration device (the on-premise access including access to at least one different device within the on-premise system).

Figure 6:
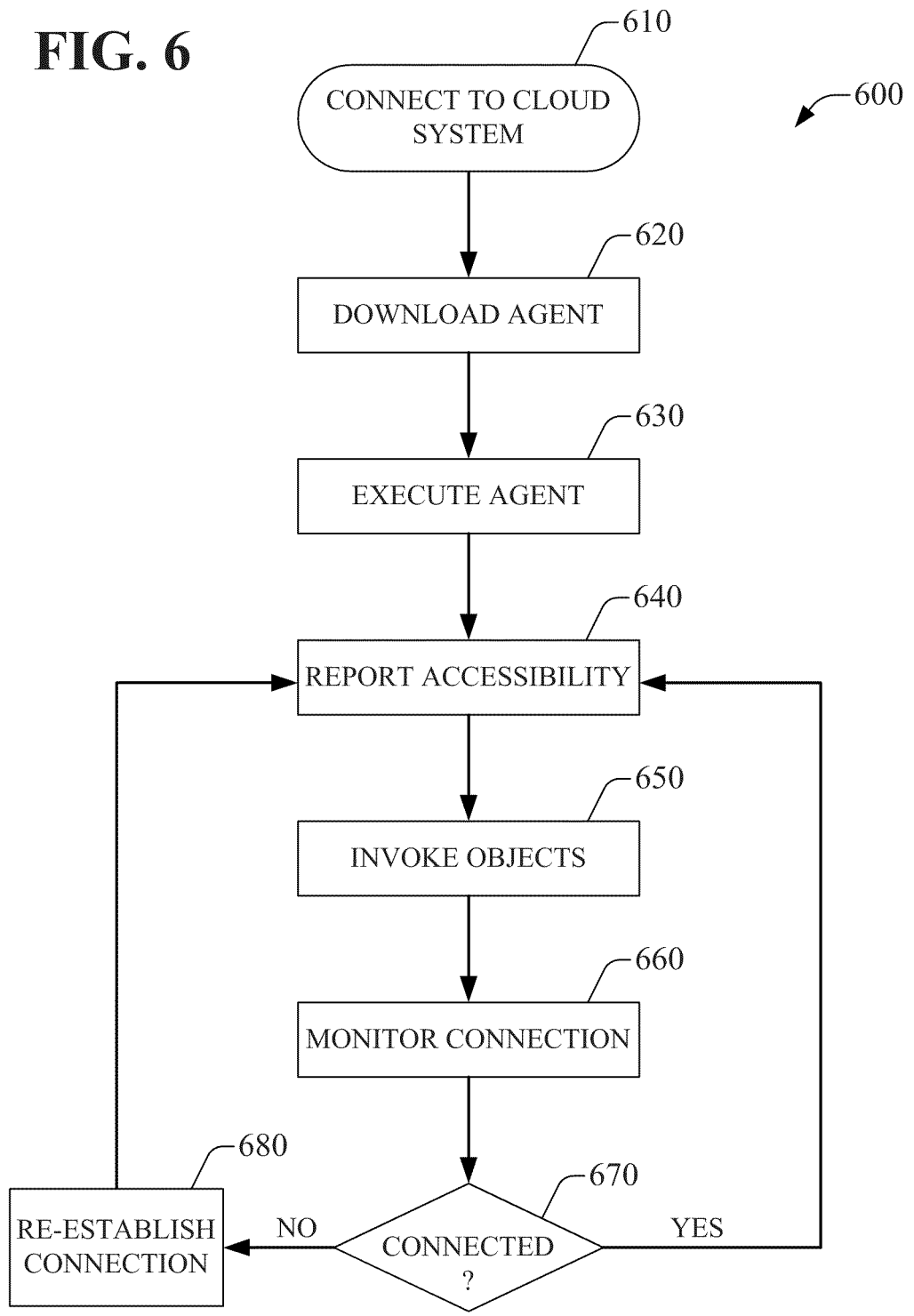
FIG. 6 is a flow diagram illustrating an exemplary methodology for integrating an on-premise system with a cloud system according to an embodiment.

Referring next to FIG. 6, illustrated is a flow diagram of an exemplary methodology for integrating an on-premise system with a cloud system according to an embodiment. As illustrated, process 600 begins at step 610 where an integration device within an on-premise system connects to a cloud system. The integration device may then download an integrating agent from the cloud system at step 620 and subsequently execute the integrating agent on the integration device at step 630. In an embodiment, upon execution of the integrating agent, a cloud application in the cloud system can authenticate/validate the integrating agent to determine whether to grant/deny access In an aspect, once the integrating agent is executed on the integration device, the cloud system "inherits" the on-premise system accessibility of the integration device. To facilitate such accessibility, at step 640, the integration device reports the extent to which it may access different devices/objects within the on-premise system (e.g., the integration device may list all other on-premise devices for which it has access).

In another aspect, once the integrating agent is executed on the integration device, distributed objects may be invoked between the cloud system and the integration device. For instance, at step 650, distributed objects residing in the cloud system may be invoked by the integration device, and distributed objects residing in the integration device (and/or distributed objects residing in on-premise devices accessible to the integration device) are accessible to the cloud system.

Process 600 then continues to step 660 where the quality of the connection between the integration device and the cloud system is periodically monitored. For instance, at step 670, the integration device may periodically monitor this connection to determine whether the quality of the connection exceeds a pre-defined threshold. If so, the quality of the connection is deemed adequate, wherein process 600 loops back to step 640 (e.g., the integration device may report the extent to which accessibility to other on-premise devices may have changed since the last reporting). If the connection quality does not exceed the predefined threshold, the connection is deemed inadequate, wherein an attempt to re-connect to the cloud system is made at step 680 prior to looping back to step 640.

Figure 7:
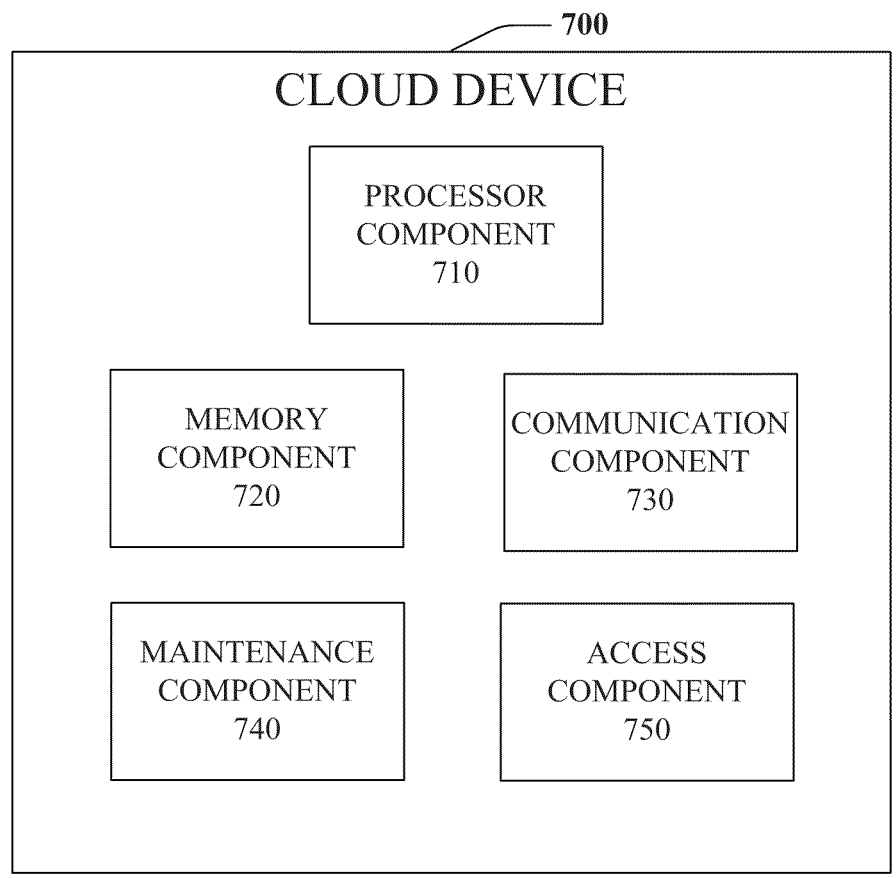
FIG. 7 illustrates a block diagram of an exemplary cloud device in accordance with an aspect of the subject specification.

Referring next to FIG. 7, a block diagram illustrates an exemplary cloud device in accordance with various aspects. As illustrated, cloud device 700 may include processor component 710, memory component 720, communication component 730, maintenance component 740, and access component 750.

Similar to processor component 310 in ERP device 300, processor component 710 is configured to execute computer-readable instructions related to performing any of a plurality of functions. Processor component 710 can be a single processor or a plurality of processors dedicated to analyzing information to be communicated from cloud device 700 and/or generating information that can be utilized by memory component 720, communication component 730, maintenance component 740, and/or access component 750. Additionally or alternatively, processor component 710 may be configured to control one or more components of cloud device 700.

In another aspect, memory component 720 is coupled to processor component 710 and configured to store computer-readable instructions executed by processor component 710. Memory component 720 may also be configured to store any of a plurality of other types of data including data generated by any of communication component 730, maintenance component 740, and/or access component 750. Here, it should be noted that memory component 720 is analogous to memory component 320 in ERP device 300. Accordingly, it should be appreciated that any of the aforementioned features/configurations of memory component 320 are also applicable to memory component 720.

For some aspects, communication component 730 is coupled to processor component 710 and configured to facilitate a communication between cloud device 700 and an integration device within an on-premise system. For instance, in one aspect, cloud device 700 receives data output by an integrating agent installed in the integration device. In other aspects, communication component 730 facilitates communicating with the integration device to provide software (e.g., to provide an integrating agent), as well to invoke distributed objects residing in the cloud system and/or the on-premise system (e.g., by sending/receiving requests for invoking such distributed objects).

In another aspect, cloud device 700 further includes maintenance component 740. In an embodiment, maintenance component 740 facilitates maintaining a persistent communication with the integration device. For this embodiment, maintenance component 740 maintains the persistent connection via a port initially opened by the integration device (e.g., a port opened by the integration device to facilitate an initial communication with cloud device 700).

As illustrated, cloud device 700 may also include an access component 750 configured facilitate accessing at least one different device within the on-premise system via the integration device. Within such embodiment, the at least one different device is accessible to cloud device 700 at least in part according to data output by the integrating agent.

Figure 8:
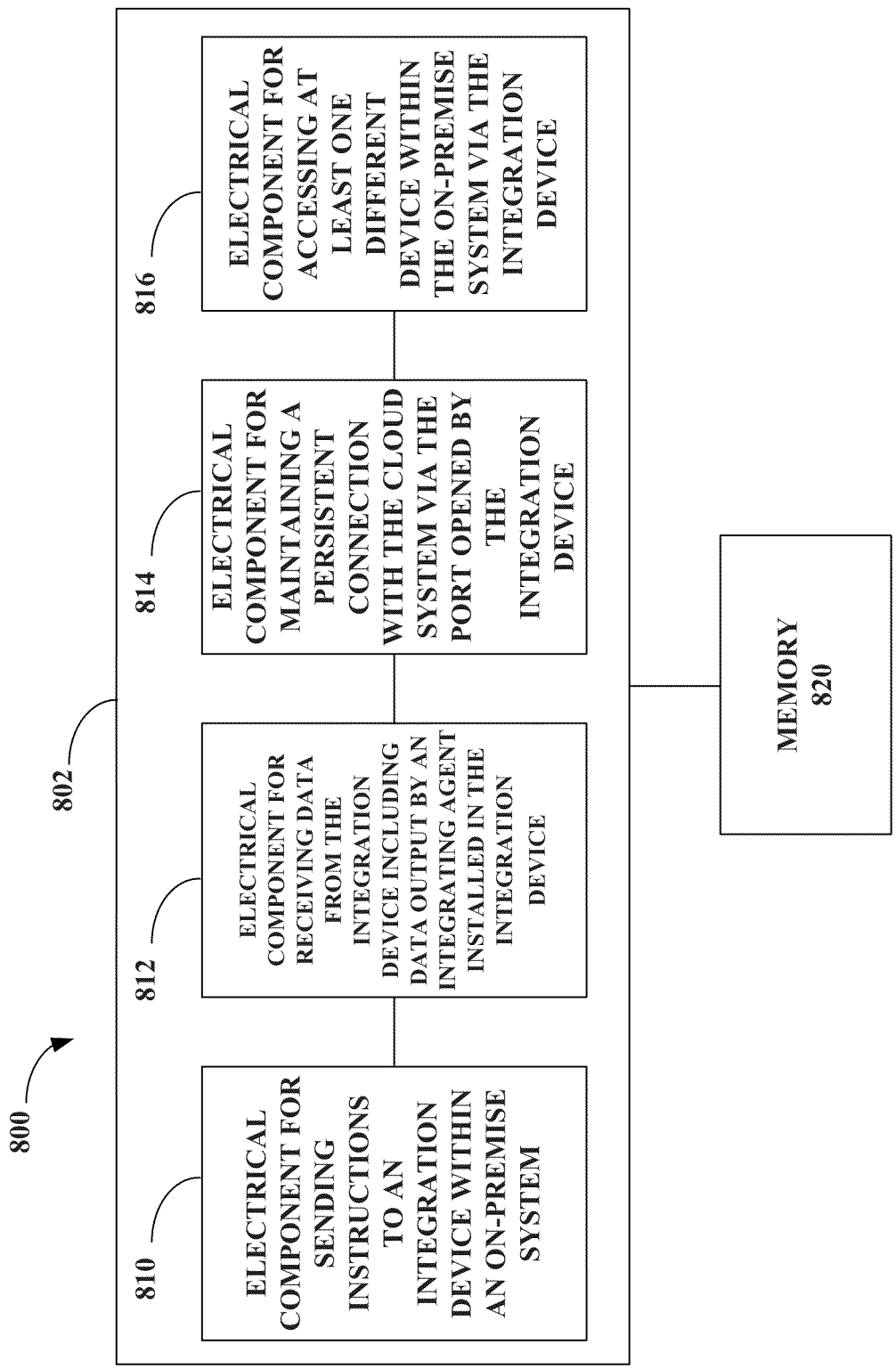
FIG. 8 is an illustration of an exemplary coupling of electrical components that facilitate integrating an on-premise system with a cloud system from within the cloud system according to an embodiment.

Referring next to FIG. 8, illustrated is another system 800 that facilitates integrating an ERP system with a cloud system, wherein system 800 can reside within the cloud system. Similar to system 400, system 800 includes functional blocks that can represent functions implemented by a processor, software, or combination thereof (e.g., firmware), wherein system 800 includes a logical grouping 802 of electrical components that can act in conjunction. As illustrated, logical grouping 802 can include an electrical component for sending instructions to an integration device within an on-premise system 810, and an electrical component for receiving data from the integration device including data output by an integrating agent installed in the integration device 812. Logical grouping 802 can also include an electrical component for maintaining a persistent connection with the cloud system via the port opened by the integration device 814. Further, logical grouping 802 can include an electrical component for accessing at least one different device within the on-premise system via the integration device 816. Additionally, system 800 can include a memory 820 that retains instructions for executing functions associated with electrical components 810, 812, 814, and 816, wherein memory 820 is substantially similar to memory 420.

Figure 9:
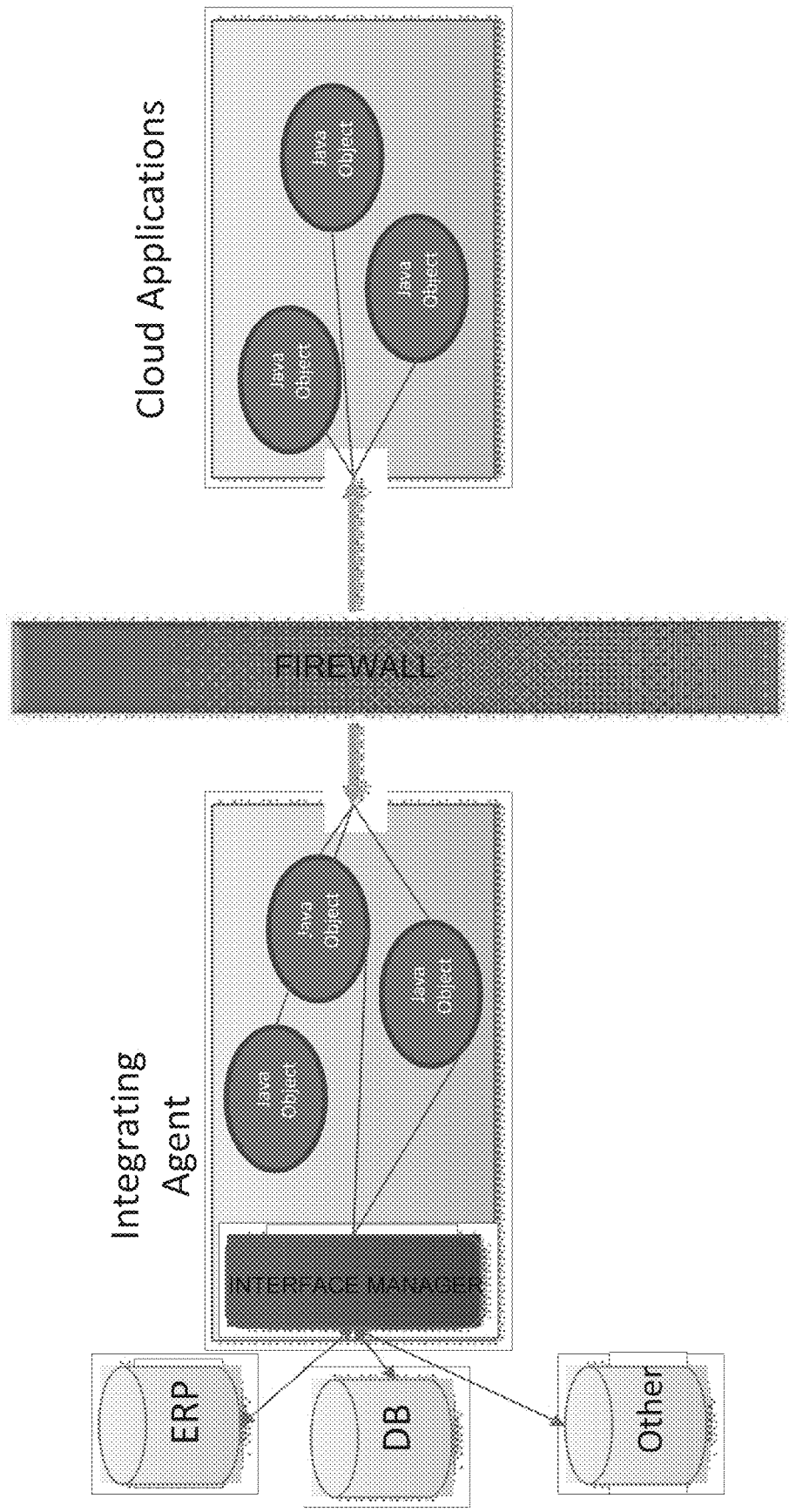
FIG. 9 illustrates an exemplary communication model for facilitating a bidirectional communication between an on-premise system and a cloud system according to an embodiment.

In order to provide seamless integration of a cloud system and an on-premise system, a communication model that facilitates an efficient bidirectional invocation of distributed objects is desirable. Namely, although facilitating a bidirectional invocation of distributed objects across a firewall has been historically undesirable because of security concerns, the subject specification discloses a methodology for providing a secure and persistent connection, which makes a bidirectional communication model more desirable. FIG. 9 illustrates an exemplary communication model 900 for facilitating a bidirectional invocation of distributed objects according to an embodiment.

Here, it should be appreciated that communication model 900 may facilitate both synchronous and asynchronous communications. For instance, in a first aspect, communication model 900 may facilitate a synchronized communication between a cloud application and an integrating agent initiated by the cloud application. In an exemplary embodiment, an object in a cloud application invokes a java object on an integrating agent to initiate data extraction from an ERP. Within such embodiment, a combination of one or more java objects in the integrating agent processes an integration request from the cloud. The result of the integration request is then returned to the cloud application java object which initiated the request.

In another aspect, communication model 900 may facilitate a synchronized communication between a cloud application and an integrating agent initiated by the integrating agent. In an exemplary embodiment, an object in an integrating agent invokes a java object in a cloud application to read ERP connection details. For this particular embodiment, an object in the cloud application may read the cloud application database for connection details and returns it to integrating agent.

In a further aspect, communication model 900 may facilitate an asynchronous communication between a cloud application and an integrating agent initiated by the cloud application. In an exemplary scenario, a cloud application issues a request to an integrating agent to extract purchase order data from an SAP system. Here, because communication model 900 facilitates bidirectional communication, the integrating agent may acknowledge the request and instantly return the acknowledgement to the cloud application (i.e., without delay). The integrating agent may thus start processing the cloud application request in parallel (i.e., extract all the requested data in parallel). The integrating agent may then notify the cloud application when the data is ready, wherein the cloud application then allows the integrating agent to send the extracted data.

In another aspect, communication model 900 may facilitate an asynchronous communication between a cloud application and an integrating agent initiated by the integrating agent. For such a scenario, the utilization of communication model 900 may be substantially similar to the utilization described for asynchronous communications initiated by the cloud application. For instance, rather than performing an on-premise extraction, a local database extraction within the cloud might be performed by the cloud application.

In yet another aspect, communication model 900 may facilitate an asynchronous event propagation between a cloud application and an integrating agent. For instance, an integrating agent may remotely subscribe to a particular event on a cloud application. For this particular scenario, whenever that event is published, the cloud application may propagate an event notification to all integrating agents who subscribe to that event.

Figure 10:
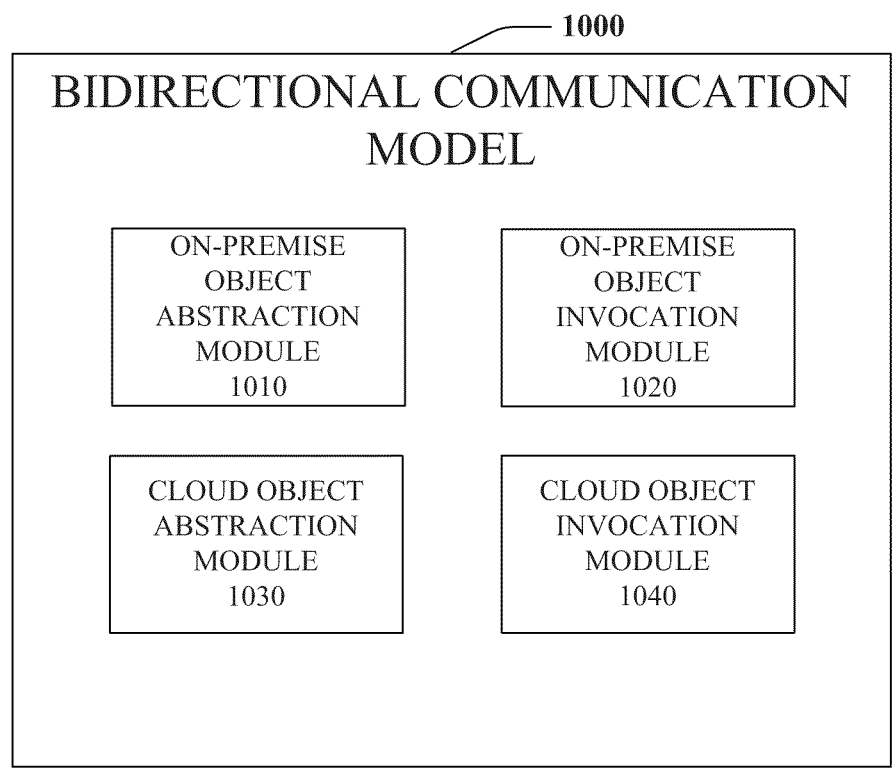
FIG. 10 illustrates a block diagram of exemplary modules for a bidirectional communication model in accordance with an aspect of the subject specification.

Referring next to FIG. 10, illustrated is a block diagram of exemplary modules for a bidirectional communication model in accordance with an aspect of the subject specification. Here, one of ordinary skill in the art will again appreciate that such modules may be stored on a computer-readable storage medium as a set of computer-readable instructions, which cause a processor to perform various acts upon execution.

As illustrated, bidirectional communication module 1000 may include on-premise object abstraction module 1010, on-premise object invocation module 1020, cloud object abstraction module 1030, and cloud object invocation module 1040. Within such embodiment, on-premise object abstraction module 1010 includes instructions for abstracting a plurality of on-premise objects residing within an on-premise system, whereas on-premise object invocation module 1020 includes instructions for facilitating requests from a cloud system to invoke particular on-premise objects. Similarly, cloud object abstraction module 1030 includes instructions for abstracting a plurality of cloud objects residing within the cloud system, whereas cloud object invocation module 1040 includes instructions for facilitating requests from the on-premise system to invoke particular cloud objects.

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Figure 11:
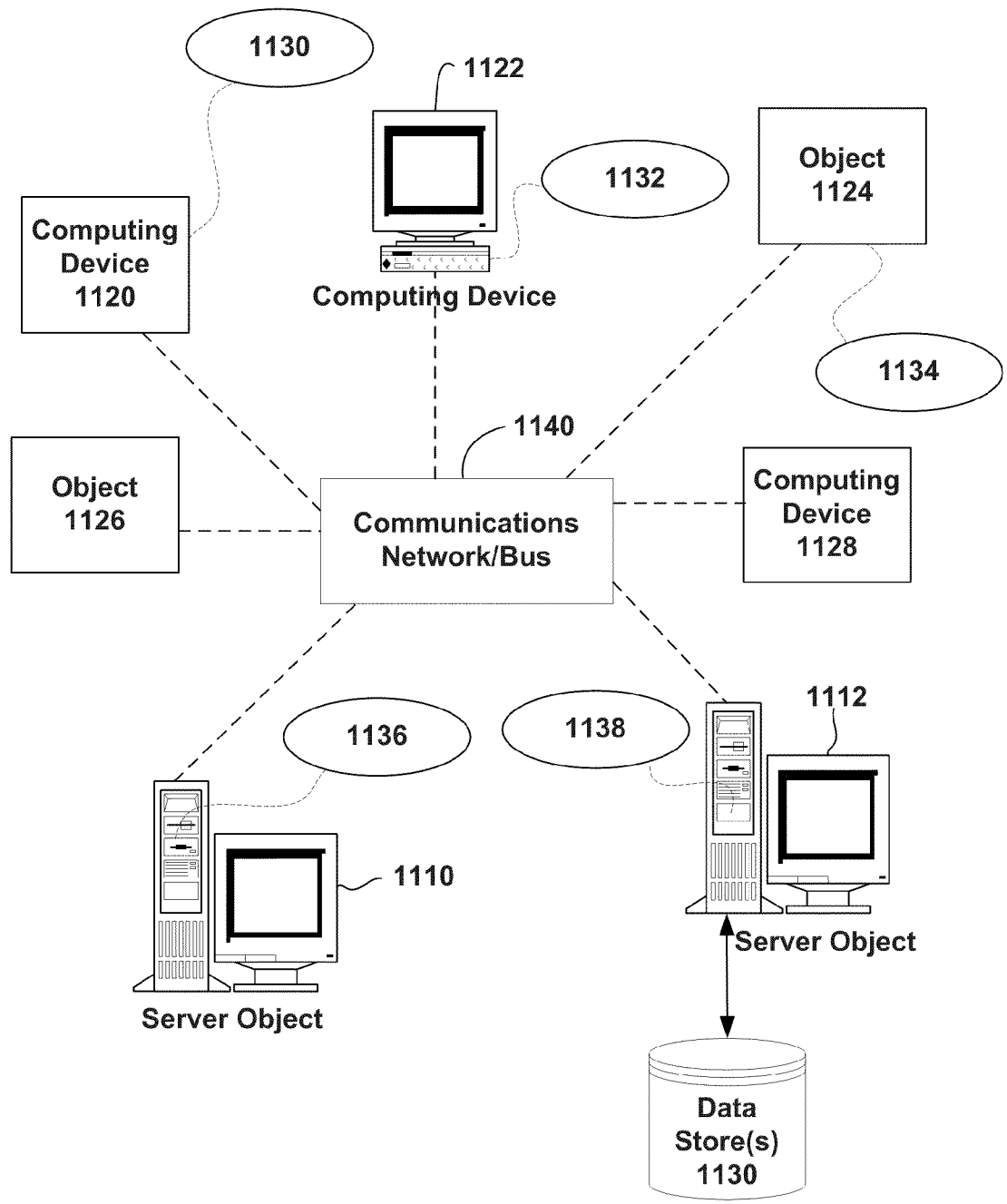
FIG. 11 is a block diagram representing an exemplary non-limiting networked environment in which aspects of embodiment(s) may be implemented.

FIG. 11 provides a non-limiting schematic diagram of an exemplary networked or distributed computing environment. The distributed computing environment comprises computing objects 1110, 1112, etc. and computing objects or devices 1120, 1122, 1124, 1126, 1128, etc., which may include programs, methods, data stores, programmable logic, etc., as represented by applications 1130, 1132, 1134, 1136, 1138. It can be appreciated that objects 1110, 1112, etc. and computing objects or devices 1120, 1122, 1124, 1126, 1128, etc. may comprise different devices, such as PDAs, audio/video devices, mobile phones, MP3 players, laptops, etc.

Each object 1110, 1112, etc. and computing objects or devices 1120, 1122, 1124, 1126, 1128, etc. can communicate with one or more other objects 1110, 1112, etc. and computing objects or devices 1120, 1122, 1124, 1126, 1128, etc. by way of the communications network 1140, either directly or indirectly. Even though illustrated as a single element in FIG. 11, network 1140 may comprise other computing objects and computing devices that provide services to the system of FIG. 11, and/or may represent multiple interconnected networks, which are not shown. Each object 1110, 1112, etc. or 1120, 1122, 1124, 1126, 1128, etc. can also contain an application, such as applications 1130, 1132, 1134, 1136, 1138, that might make use of an API, or other object, software, firmware and/or hardware, suitable for communication with or implementation of the user profiling in a transaction and advertising platform as provided in accordance with various embodiments.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

Thus, a host of network topologies and network infrastructures, such as client/server, peer-to-peer, or hybrid architectures, can be utilized. In a client/server architecture, particularly a networked system, a client is usually a computer that accesses shared network resources provided by another computer, e.g., a server. In the illustration of FIG. 11, as a non-limiting example, computers 1120, 1122, 1124, 1126, 1128, etc. can be thought of as clients and computers 1110, 1112, etc. can be thought of as servers where servers 1110, 1112, etc. provide data services, such as receiving data from client computers 1120, 1122, 1124, 1126, 1128, etc., storing of data, processing of data, transmitting data to client computers 1120, 1122, 1124, 1126, 1128, etc., although any computer can be considered a client, a server, or both, depending on the circumstances. Any of these computing devices may be processing data, or requesting services or tasks that may implicate the improved user profiling and related techniques as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the user profiling can be provided standalone, or distributed across multiple computing devices or objects.

In a network environment in which the communications network/bus 1140 is the Internet, for example, the servers 1110, 1112, etc. can be Web servers with which the clients 1120, 1122, 1124, 1126, 1128, etc. communicate via any of a number of known protocols, such as the hypertext transfer protocol (HTTP). Servers 1110, 1112, etc. may also serve as clients 1120, 1122, 1124, 1126, 1128, etc., as may be characteristic of a distributed computing environment.

Exemplary Computing Device

As mentioned, various embodiments described herein apply to any device wherein it may be desirable to implement/support integration of cloud services with enterprise applications. It should be understood, therefore, that handheld, portable and other computing devices and computing objects of all kinds are contemplated for use in connection with the various embodiments described herein. Accordingly, the below general purpose remote computer described below in FIG. 12 is but one example, and the embodiments of the subject disclosure may be implemented with any client having network/bus interoperability and interaction.

Although not required, any of the embodiments can partly be implemented via an operating system, for use by a developer of services for a device or object, and/or included within application software that operates in connection with the operable component(s). Software may be described in the general context of computer-executable instructions, such as program modules, being executed by one or more computers, such as client workstations, servers or other devices. Those skilled in the art will appreciate that network interactions may be practiced with a variety of computer system configurations and protocols.

Figure 12:
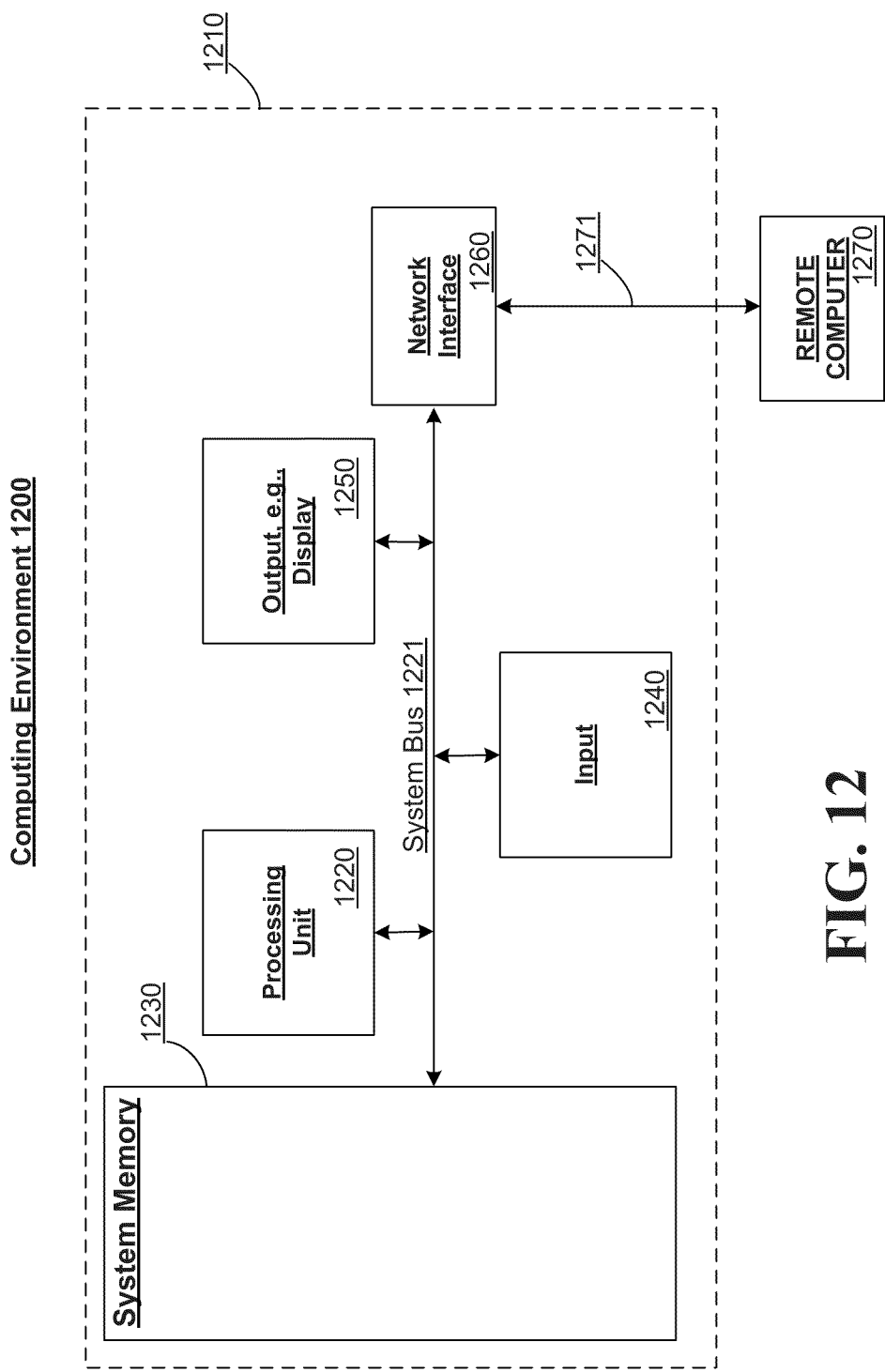
FIG. 12 is a block diagram representing an exemplary non-limiting computing system or operating environment in which aspects of embodiment(s) may be implemented.

FIG. 12 thus illustrates an example of a suitable computing system environment 1200 in which one or more of the embodiments may be implemented, although as made clear above, the computing system environment 1200 is only one example of a suitable computing environment and is not intended to suggest any limitation as to the scope of use or functionality of any of the embodiments. Neither should the computing environment 1200 be interpreted as having any dependency or requirement relating to any one or combination of components illustrated in the exemplary operating environment 1200.

With reference to FIG. 12, an exemplary remote device for implementing one or more embodiments herein can include a general purpose computing device in the form of a handheld computer 1210. Components of handheld computer 1210 may include, but are not limited to, a processing unit 1220, a system memory 1230, and a system bus 1221 that couples various system components including the system memory to the processing unit 1220.

Computer 1210 typically includes a variety of computer readable media and can be any available media that can be accessed by computer 1210. The system memory 1230 may include computer storage media in the form of volatile and/or nonvolatile memory such as read only memory (ROM) and/or random access memory (RAM). By way of example, and not limitation, memory 1230 may also include an operating system, application programs, other program modules, and program data.

A user may enter commands and information into the computer 1210 through input devices 1240 A monitor or other type of display device is also connected to the system bus 1221 via an interface, such as output interface 1250. In addition to a monitor, computers may also include other peripheral output devices such as speakers and a printer, which may be connected through output interface 1250.

The computer 1210 may operate in a networked or distributed environment using logical connections to one or more other remote computers, such as remote computer 1270. The remote computer 1270 may be a personal computer, a server, a router, a network PC, a peer device or other common network node, or any other remote media consumption or transmission device, and may include any or all of the elements described above relative to the computer 1210. The logical connections depicted in FIG. 12 include a network 1271, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices, networks and advertising architectures, the underlying concepts may be applied to any network system and any computing device or system in which it is desirable to derive information about surrounding points of interest.

There are multiple ways of implementing one or more of the embodiments described herein, e.g., an appropriate API, tool kit, driver code, operating system, control, standalone or downloadable software object, etc. which enables applications and services to use the pointing based services. Embodiments may be contemplated from the standpoint of an API (or other software object), as well as from a software or hardware object that provides pointing platform services in accordance with one or more of the described embodiments. Various implementations and embodiments described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

While the various embodiments have been described in connection with the preferred embodiments of the various figures, it is to be understood that other similar embodiments may be used or modifications and additions may be made to the described embodiment for performing the same function without deviating there from. Still further, one or more aspects of the above described embodiments may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A non-transitory computer-readable storage medium for integrating an on-premise system with a cloud system, having one or more computer-readable instructions when read, cause one or more processors on a client device to execute steps comprising: identifying a port opened by an integration device within the on-premise system to communicate with the cloud system; maintaining a persistent connection with the cloud system via the port opened by the integration device; and providing on-premise access to the cloud system via the integration device, the on-premise access including access to at least one different device within the on-premise system; reporting an extent of accessibility to the cloud system, wherein the extent of accessibility identifies an extent to which the cloud system may access the on-premise system.

2. The non-transitory computer-readable storage medium of claim 1 further comprising instructions for causing the at least one processor to invoke a plurality of distributed objects.

3. The non-transitory computer-readable storage medium of claim 2 further comprising instructions for causing the at least one processor to send a request to the cloud system to invoke the plurality of distributed objects, wherein the plurality of distributed objects reside in the cloud system.

4. The non-transitory computer-readable storage medium of claim 2 further comprising instructions for causing the at least one processor to receive a request from the cloud system to invoke the plurality of distributed objects, wherein the plurality of distributed objects reside in the on-premise system.

5. The non-transitory computer-readable storage medium of claim 4 further comprising instructions for causing the at least one processor to invoke the plurality of distributed objects, wherein the plurality of distributed objects reside in the at least one different device.

6. The non-transitory computer-readable storage medium of claim 1 further comprising instructions for causing the at least one processor to provide authentication information to the cloud system.

7. The non-transitory computer-readable storage medium of claim 1 further comprising instructions for causing the at least one processor to ascertain a plurality of devices within the on-premise system that are accessible by the cloud system, wherein the plurality of devices are identified in the extent of accessibility.

8. The non-transitory computer-readable storage medium of claim 1 further comprising instructions for causing the at least one processor to ascertain a plurality of objects stored in the on-premise system that are accessible by the cloud system, wherein the plurality of objects are identified in the extent of accessibility.

9. The non-transitory computer-readable storage medium of claim 1 further comprising instructions for causing the at least one processor to monitor a quality of the persistent connection.

10. The non-transitory computer-readable storage medium of claim 9 further comprising instructions for causing the at least one processor to re-connect with the cloud system if the quality fails to exceed a pre-defined threshold.

11. A cloud device that facilitates integrating the cloud system device with an on-premise system, comprising: a processor; and a memory component communicatively coupled to the processor, the memory component having stored therein computer-executable instructions that when executed by the processor cause the processor to implement: a communication component configured to facilitate a communication between the cloud device and an integration device with the on-premise system, the communication component configured to receive data output by an integrating agent installed in the integration device; a maintenance component configured to facilitate maintaining a persistent communication between the cloud device and the integration device, the maintenance component configured to maintain the persistent communication via a port initially opened by the integration device; and an access component configured to facilitate accessing at least one different device within the on-premise system via the integration device, the access component configured to access the at least one different device at least in part according to the data output by the integrating agent; wherein, the integration device is configured to report an extent of accessibility to the cloud system, wherein the extent of accessibility identifies an extent to which the cloud system may access the on-premise system.

12. The cloud device of claim 11 further configured to provide the integration device with access to data stored in the cloud system according to an authentication of the integrating agent.

13. The cloud device of claim 11 further configured to invoke a plurality of distributed objects within the cloud system, wherein the communication component is configured to receive a request from the integration device to invoke the plurality of distributed objects.

14. The cloud device of claim 11 further configured to invoke a plurality of distributed objects within the on-premise system, wherein the communication component is configured to send a request to the integration device to invoke the plurality of distributed objects.

15. A non-transitory computer-readable storage medium for facilitating a bidirectional communication of distributed objects between an on-premise system and a cloud system, having one or more computer-readable instructions when read, cause one or more processors on a client device to execute steps comprising: abstracting a plurality of on-premise objects residing within the on-premise system; facilitating requests from the cloud system to invoke at least one of the plurality of on-premise objects; abstracting a plurality of cloud objects residing within the cloud system; and facilitating requests from the on-premise system to invoke at least one of the plurality of cloud objects; reporting an extent of accessibility to the cloud system, wherein the extent of accessibility identifies an extent to which the cloud system may access the on-premise system.

16. The non-transitory computer-readable storage medium of claim 15 further comprising instructions for causing the at least one processor to initiate and maintain a persistent bidirectional connection between an integrating agent and a cloud application.

17. The non-transitory computer-readable storage medium of claim 15 further comprising instructions for causing the at least one processor to integrate an on-premise system with a cloud application using an integrating agent.

18. The non-transitory computer-readable storage medium of claim 15 further comprising instructions for causing the at least one processor to facilitate at least one of a synchronous or asynchronous object communication between a cloud application and an integrating agent.

* * * * *